US012610882B2

(12) United States Patent
Otto et al.

(10) Patent No.: US 12,610,882 B2
(45) Date of Patent: Apr. 28, 2026

(54) METHOD OF MANUFACTURING A KNIFE BLADE FOR A CUTTER KNIFE AND CUTTER KNIFE

(71) Applicant: SMF—Holding GmbH, Eichelhardt (DE)

(72) Inventors: Sascha Otto, Racksen (DE); Ralf Schmidt, Mörsbach (DE)

(73) Assignee: SMF—HOLDING GMBH, Eichelhardt (DE)

(*) Notice: Subject to any disclaimer, the term of this patent is extended or adjusted under 35 U.S.C. 154(b) by 964 days.

(21) Appl. No.: 17/772,387

(22) PCT Filed: Oct. 27, 2020

(86) PCT No.: PCT/EP2020/080151
§ 371 (c)(1),
(2) Date: Apr. 27, 2022

(87) PCT Pub. No.: WO2021/083875
PCT Pub. Date: May 6, 2021

(65) Prior Publication Data
US 2022/0386524 A1 Dec. 8, 2022

(30) Foreign Application Priority Data
Oct. 29, 2019 (DE) .......................... 102019129219.0

(51) Int. Cl.
*A01D 34/14* (2006.01)
*B21D 53/64* (2006.01)
(52) U.S. Cl.
CPC ........... *A01D 34/14* (2013.01); *B21D 53/647* (2013.01)

(58) Field of Classification Search
CPC ..... B21D 19/088; B21D 53/647; A10D 34/14
See application file for complete search history.

(56) References Cited

U.S. PATENT DOCUMENTS 4,223,514 A 9/1980 Halls et al.
2007/0234776 A1* 10/2007 Shiga ................... B21D 19/088
72/325

(Continued)

FOREIGN PATENT DOCUMENTS

DE 1582404 A1 4/1970
DE 3813353 A1 11/1989

(Continued)

OTHER PUBLICATIONS

Machine translation of JP-2019214068-A (Year: 2019).*
International Search Report of PCT/EP2020/080151 dated Feb. 15, 2021 [PCT/ISA/210].

*Primary Examiner* — Kyle A Cook
(74) *Attorney, Agent, or Firm* — Sughrue Mion, PLLC

(57) ABSTRACT

A method of manufacturing a knife blade for a cutter knife of an agricultural harvesting machine, wherein a substantially disk-shaped blade blank is provided in a providing step, said blade blank having a bottom side extending in a first plane (YZ1) and a top side extending in a second plane (YZ2), wherein a hole connecting the first plane (YZ1) with the second plane (YZ2) is made in the blade blank, wherein in a reshaping step an area of the blade blank surrounding the hole is deformed in such a way that a top contact surface surrounding the hole is formed in a third plane (YZ3), wherein the third plane is more distant from the first plane than the second plane (YZ2) in a normal direction (X) perpendicular to the first plane (YZ1).

5 Claims, 9 Drawing Sheets

(56) References Cited

U.S. PATENT DOCUMENTS

| 2020/0187412 | A1 * | 6/2020 | Otto | .................... | A01D 34/13 |
| 2020/0230683 | A1 * | 7/2020 | Ito | .................... | B21D 19/088 |

FOREIGN PATENT DOCUMENTS

| DE | 102016103271 | A1 * | 8/2017 | | |
| DE | 102017112444 | A1 | 12/2017 | | |
| JP | 2019214068 | A * | 12/2019 | ........... | B21D 19/088 |

* cited by examiner

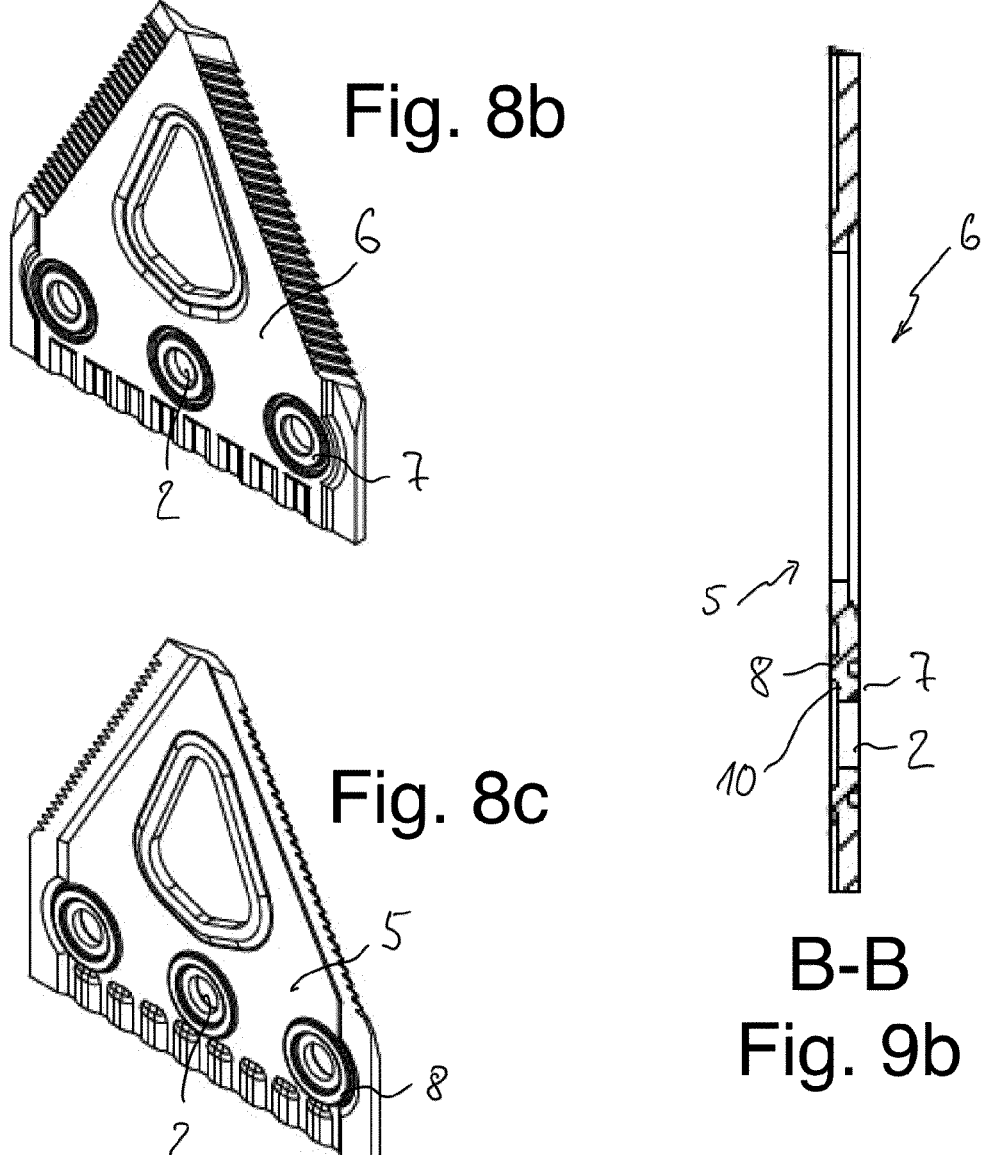
Fig. 8b
6
7
2
Fig. 8c
5
8
2
6
5
8
7
10
2
B-B
Fig. 9b
Fig. 9a                    A-A
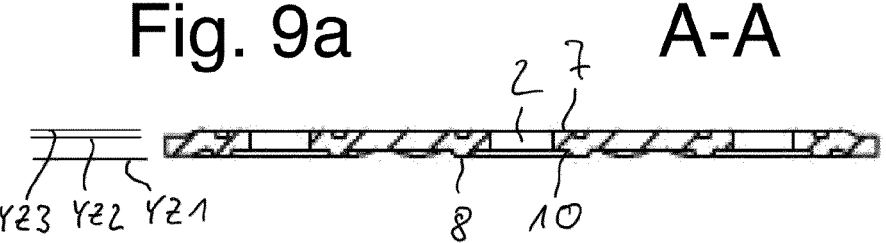
2    7
8    10
YZ3  YZ2  YZ1

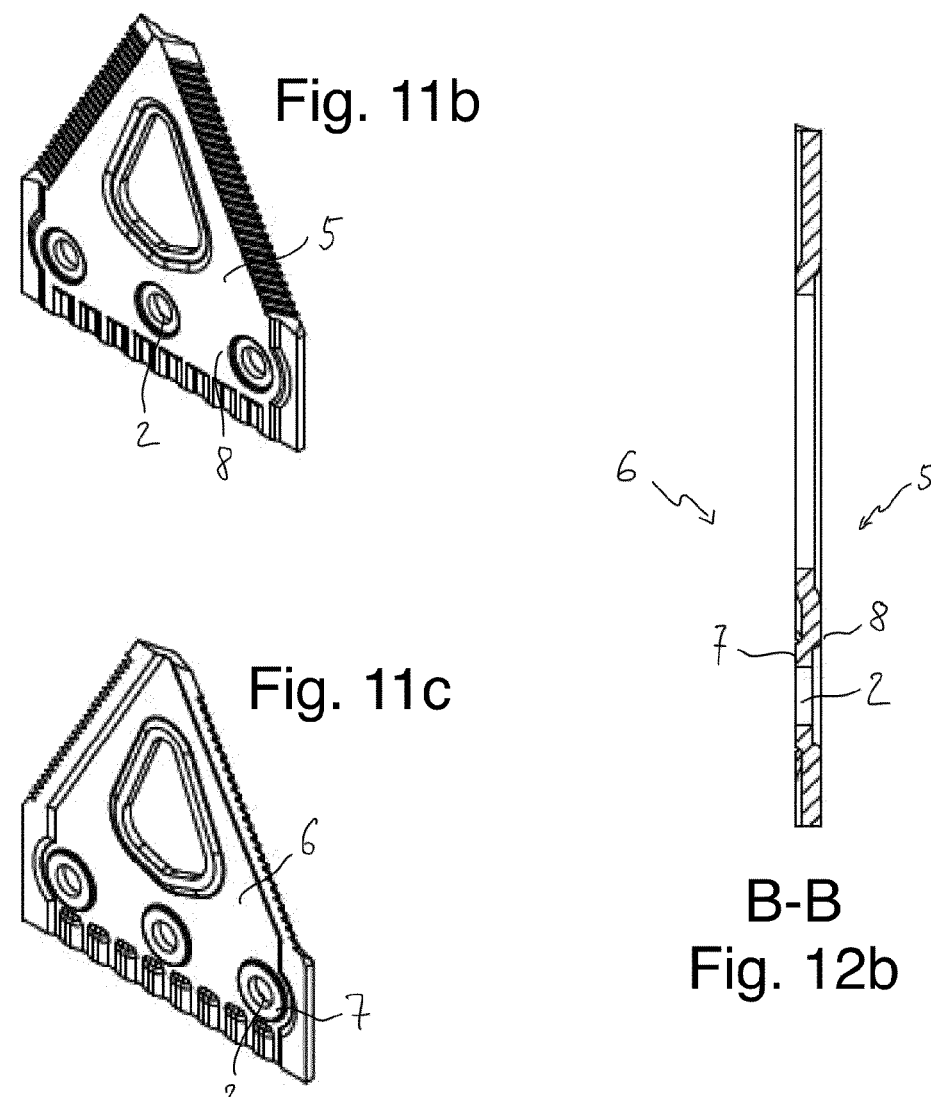
Fig. 11b
Fig. 11c
B-B
Fig. 12b
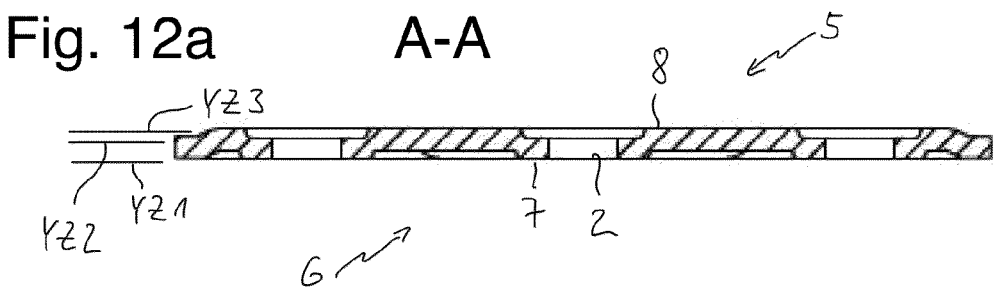
Fig. 12a     A-A

METHOD OF MANUFACTURING A KNIFE BLADE FOR A CUTTER KNIFE AND CUTTER KNIFE

CROSS REFERENCE TO RELATED APPLICATIONS

This application is a National Stage of International Application No. PCT/EP2020/080151 filed on Oct. 27, 2020, claiming priority based on German Patent Application No. 102019129219.0 filed on Oct. 29, 2019,, the entire contents of which are incorporated herein by reference.

The following disclosure relates to a method of manufacturing a knife blade for a cutter knife of an agricultural harvesting machine, wherein a substantially disk-shaped blade blank is provided in a providing step, and wherein the blade blank has a bottom side extending in a first plane and a top side extending in a second plane, and to a knife blade for a cutter knife of an agricultural harvesting machine manufactured according to the method.

Knife blades of this type are commonly used in mower units of agricultural harvesting machines. A plurality of knife blades are arranged side by side and screwed or riveted to a knife rail. During the manufacturing process, corresponding holes are made in the knife blade, for example to accommodate the fasteners.

U.S. Pat. No. 4,223,514 A relates to a cutter knife with reduced material thickness, in which recess areas and reinforcement areas are formed on the knife surface, thereby reducing the weight of the knife blade and saving material. The mounting holes have a circumferential protrusion that projects beyond a bottom surface facing the blade rail. These protrusions are to be fitted into matching recesses in the knife rail. If no suitable recesses are available, it is suggested to grind off the protrusions or to produce them already in the manufacturing process in such a way that they do not project beyond the bottom surface of the cutter knife.

A disadvantage of the prior art cutter knife is that its orientation with respect to mounting on the knife rail is predetermined and not changeable. An objective can be to improve a knife blade and a method for manufacturing a knife blade in such a way that it is possible to mount both surfaces on a knife rail.

The objective is achieved by the method and by the knife blade described herein.

In the method of manufacturing a knife blade for a cutter knife of an agricultural harvesting machine, a substantially disk-shaped blade blank is provided in a providing step, wherein the blade blank has a bottom side extending in a first plane and a top side extending in a second plane. A hole connecting the first plane to the second plane is made in the blade blank. In a reshaping step, an area of the blade blank surrounding the hole is deformed such that a top contact surface surrounding the hole is formed in a third plane, wherein the third plane is more distant from the first plane than the second plane in a normal direction perpendicular to the first plane.

An advantage of the method is that the top contact surface surrounding the hole is formed in a simple manner by a forming process. The top contact surface is used to attach the knife blade to a plane surface, such as a knife rail. In the case of a mass-reduced knife blade, a material thickness of the knife blade in the normal direction is smaller, at least in certain sections, than a distance in the normal direction between the third plane and the first plane. By the method, the contact surface is formed in the third plane.

The blade blank is provided, for example, by casting or reshaping, wherein providing in the sense of the disclosure also comprises a procurement of the blade blank from a third-party production process. At least one hole is provided in the blade blank. Alternatively, the hole may already be present in the provided blade blank, for example by producing the blade blank in a stamping process with the hole. Alternatively, the hole may be introduced in a separate step, for example as a bore. Even though the hole is mostly referred to in the singular in the context of the disclosure, it is understood that several holes per blank can be made simultaneously or successively. Generally, the hole in the blade blank may initially be formed not as a through-hole but as a blind hole, wherein the through-hole is formed by the deformation during the reshaping step.

The first plane is defined by spatial directions Y and Z arranged at right angles to each other in space in terms of a Cartesian coordinate system. The designation plane YZ1 is also used for the first plane. The normal direction perpendicular to the first plane thus corresponds to a spatial direction X in the sense of a Cartesian coordinate system.

The term contact surface is used to describe a planar surface that allows contact with another planar component, such as a knife rail to which the knife blades are attached. The term screw-on surface is also used in this context.

According to an embodiment of the method, it is provided that the area surrounding the hole is deformed by tensile compression reshaping to form the top contact surface, wherein the hole is brought to a target cross-sectional area in the reshaping step by the tensile compression reshaping. The target cross-sectional area may be larger or smaller than a cross-sectional area of the hole prior to the reshaping step.

According to a further embodiment of the method, it is provided that the blade blank is formed in the reshaping step with an upper forming die and a lower forming die, wherein one of the forming dies has a calibrating pin engaging in the hole, wherein a pressing pressure is applied to the forming dies, thereby forming the top contact surface.

According to a further embodiment of the method, it is provided that at least one shaping step is provided in which the blade blank is shaped in such a way that a material thickness of the blade is at least in sections less than a height of the blade, wherein the height of the blade corresponds to a distance from the first plane to the third plane in the normal direction. The forming step serves to provide the blade blank having a material thickness corresponding to a distance of the first plane to the second plane in the normal direction.

According to a further embodiment of the method, a peripheral rim is formed around the hole on the bottom side of the blade blank in the reshaping step, wherein the peripheral rim is arranged in the normal direction between the first plane and the second plane. Further, in the reshaping step, a bottom contact surface may be formed around the hole on the bottom side of the blade blank, wherein the bottom contact surface is disposed in the first plane. For example, the bottom contact surface is formed in the reshaping step around the peripheral rim.

In a further embodiment of the method, the reshaping step comprises a first reshaping and a second reshaping, wherein in the first reshaping the area of the blade blank surrounding the hole is deformed into a stub extending in the normal direction perpendicular to the first plane from the blade blank, and wherein in the subsequent second reshaping the stub is calibrated to the desired height of the knife blade, the height of the knife blade corresponding to the distance from the first plane to the third plane in the normal direction.

For example, the area surrounding the hole is concentric around the hole. The area may extend in the first plane over a surface area corresponding to a multiple of the cross-sectional area of the hole, for example two to 20 times the cross-sectional area, in particular five to 15 times the cross-sectional area.

In the first reshaping, the forming is carried out, for example, as a tensile compression reshaping. Advantageously, the stub can be formed, for example, by deep drawing, wherein deep drawing of the area surrounding the hole is also referred to as collar drawing. In principle, the hole in the blade blank can initially be formed not as a through hole but as a blind hole, wherein the through hole is formed by the deformation during the first reshaping. During the subsequent second reshaping, the stub is calibrated to the predetermined height in the normal direction perpendicular to the first plane. By calibrating in the sense of the disclosure is meant that the height of the stub in the normal direction is brought to a predetermined dimension.

According to a further embodiment of the method, it is provided that the hole is expanded to an intermediate cross-sectional area during the first reshaping, wherein the hole surrounded by the stub is brought to a target cross-sectional area by a pressing operation during the second reshaping, wherein the target cross-sectional area is smaller than or equal to the intermediate cross-sectional area.

According to a further embodiment of the method, the deformation of the stub during the second reshaping forms the top contact surface surrounding the hole in the third plane. During the second reshaping, for example, a bottom contact surface is further formed around the hole on the bottom side of the blade blank, wherein the bottom contact surface is arranged in the first plane.

Another aspect relates to a knife blade for a cutter knife of an agricultural harvesting machine manufactured according to the method described. The knife blade has a bottom contact surface extending in the first plane. According to an embodiment, the knife blade has an top contact surface extending in the third plane. The third plane and the first plane are aligned parallel to each other, for example.

According to an embodiment of the knife blade, a planar surface is disposed on at least one of the surfaces of the top side and the bottom side of the blade blank. The top contact surface extending in the third plane forms, for example, a partial surface of the planar surface on the top side. The bottom contact surface extending in the first plane forms, for example, a partial surface of the planar surface on the bottom side. The bottom contact surface may be machined together with a cutting edge on the blade blank as part of the planar surface on the bottom side by means of a metal-cutting manufacturing process.

For example, the planar surface is formed as a plane, wherein any points on the planar surface are spatially arranged in the plane, in this case in the third plane or in the first plane. A recess area may also form a surface, but the surface may be uneven, i.e., arcuate or curved, so that points on the surface of the recess area are spatially arranged in different planes. Planarity or planicity is also used to refer to a certain surface finish, which refers to a surface roughness. However, the term planar surface is not to be understood as claiming a certain surface finish. The planar surface may have been machined by means of at least one machining manufacturing process to provide a certain surface roughness. However, the skilled person recognizes that the planar surface in the sense of the disclosure can also be produced without machining the surface, already by a primary forming method, such as casting or sintering.

Where the designations top side of the blade and bottom side of the blade are used, these are chosen arbitrarily and correspond to the mainly usual installation position of the knife blade. The knife blade manufactured according to the invention can advantageously also be installed in a mounting position with the bottom side of the blade facing upwards, depending on how the cutting unit of the harvesting machine is constructed. With the top contact surface and the bottom contact surface, the knife blade can advantageously be attached to the knife rail with each of the two surfaces aligned with the knife rail.

Knife blades of this type are commonly used in mower units of agricultural harvesting machines. In this case, a plurality of the knife blades are screwed or riveted to the knife rail in a side-by-side arrangement, wherein the knife tips, which are formed by the tapered cutting edge areas, point in the working direction. The knives formed in this way are guided on a knife bar so that they move back and forth transversely to the working direction. The cutting edges of the knife blades cooperate here with finger guards attached to the knife bar, wherein the finger guards can form counter-cutting edges in the form of a blade gap. In this case, the cutting edges of the knife blades are aligned at an angle to the working direction and the counter-blades of the cutter fingers are approximately parallel to the working direction, so that the crop can dip into the cutting area between the knife blades and the finger guards and is cut off by the back and forth movement of the cutter knife. An alternative possibility is to use it as a double cutter knife with two cutter knives moving in opposite directions, or one fixed and one moving cutter knife without finger guards. The height of the knife blade is adapted to the clear dimension of the blade gap in such a way that there is a certain distance between the knife blade and the respective counter blade, since the clear dimension of the blade gap is subject to a tolerance and the knife blade is bent during operation by forces exerted by the crop. On the other hand, the distance between the knife blade and the respective counter-blade must not be too large, as then crop can be drawn into the blade gap and is not cut.

The invention is explained in more detail below by means of an exemplary embodiment with reference to the accompanying drawings. The illustrations are exemplary and do not restrict the general idea of the invention. In the Figures, FIGS. 1a, 1b and 1c show a provided blade blank according to a first exemplary embodiment of the method before a reshaping step in different views;

FIGS. 5a, 5b and 5c show a knife blade produced according to the exemplary embodiment of the method according to FIG. 4 in various views;

FIGS. 6a and 6b show the knife blade according to FIG. 5a in sectional views;

Figures 1A, 1B, 1C:
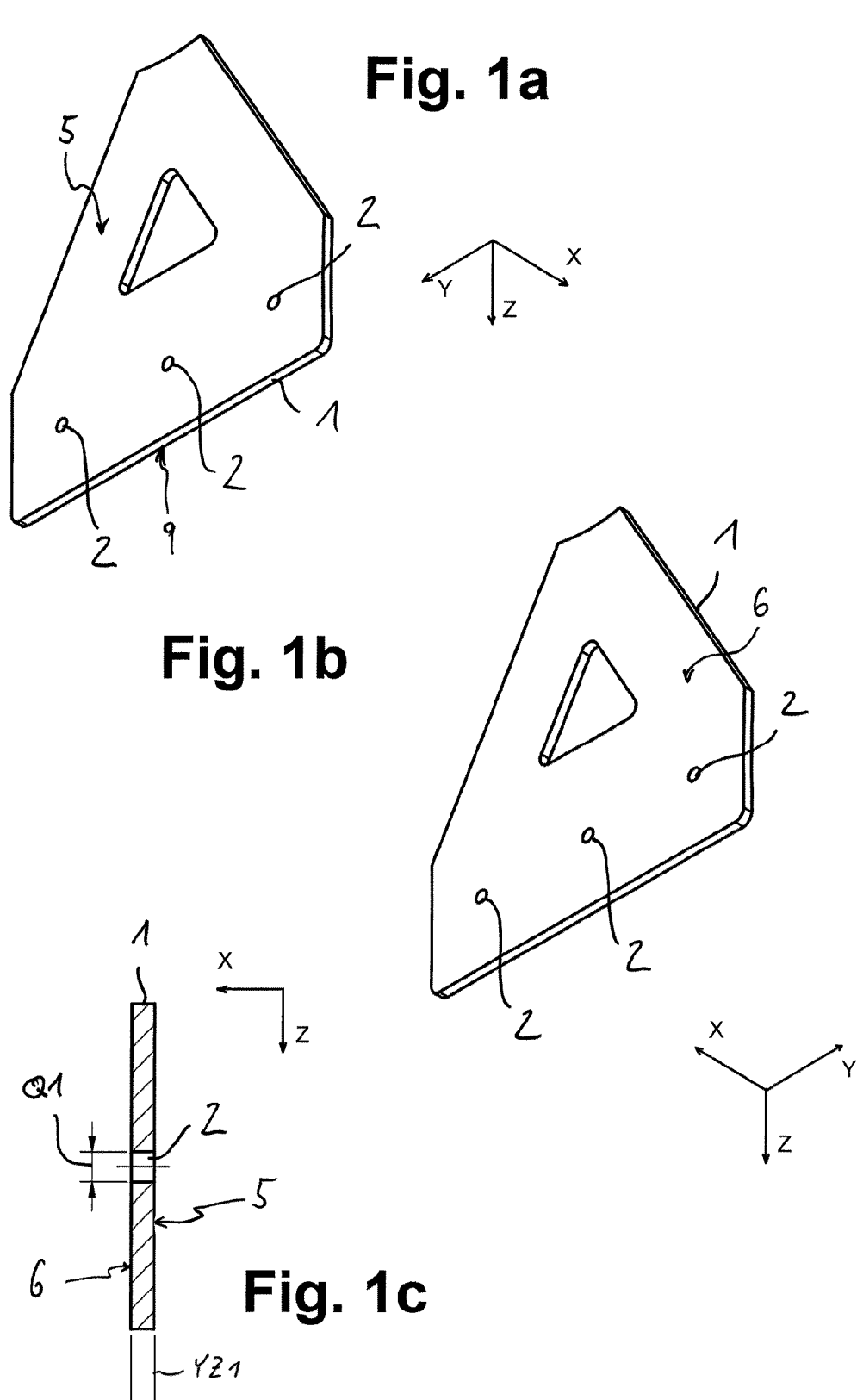
Figure 7:
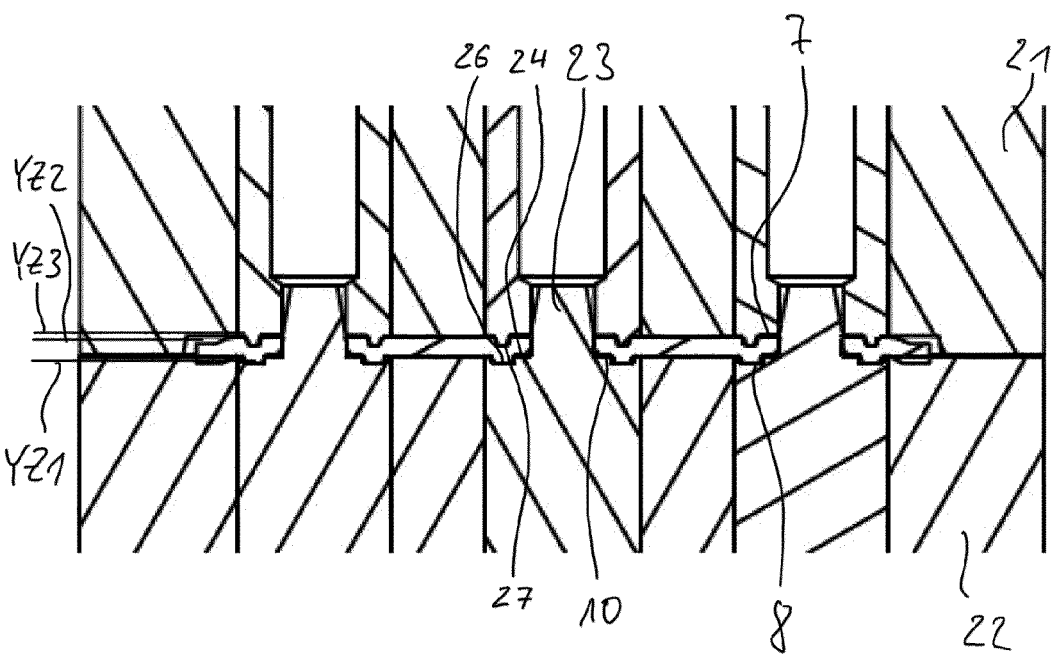
FIG. 7 shows a schematic sectional view of the blade blank according to FIG. 1a during the reshaping step according to a further exemplary embodiment of the method in a tool.
Figure 8A:
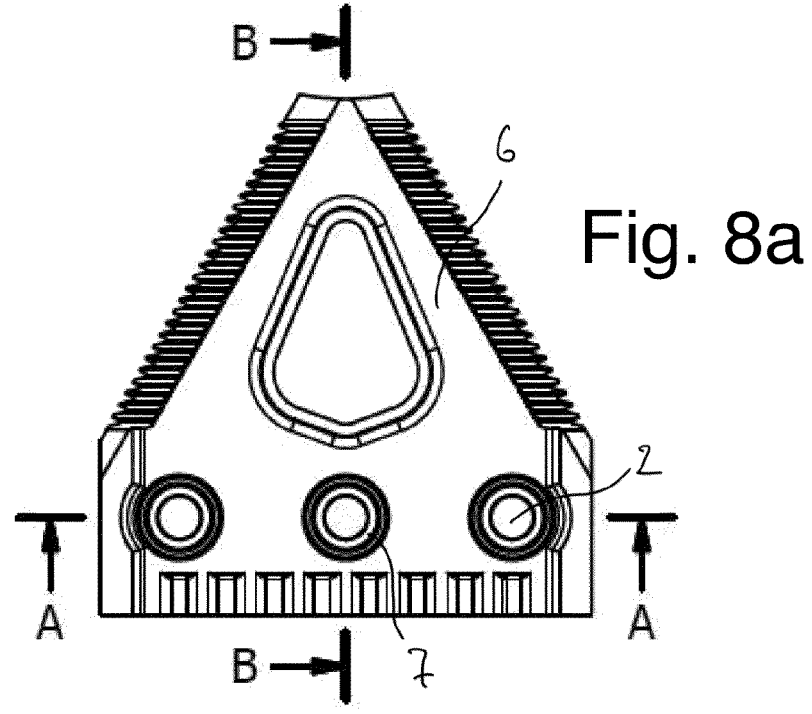
Figure 10:
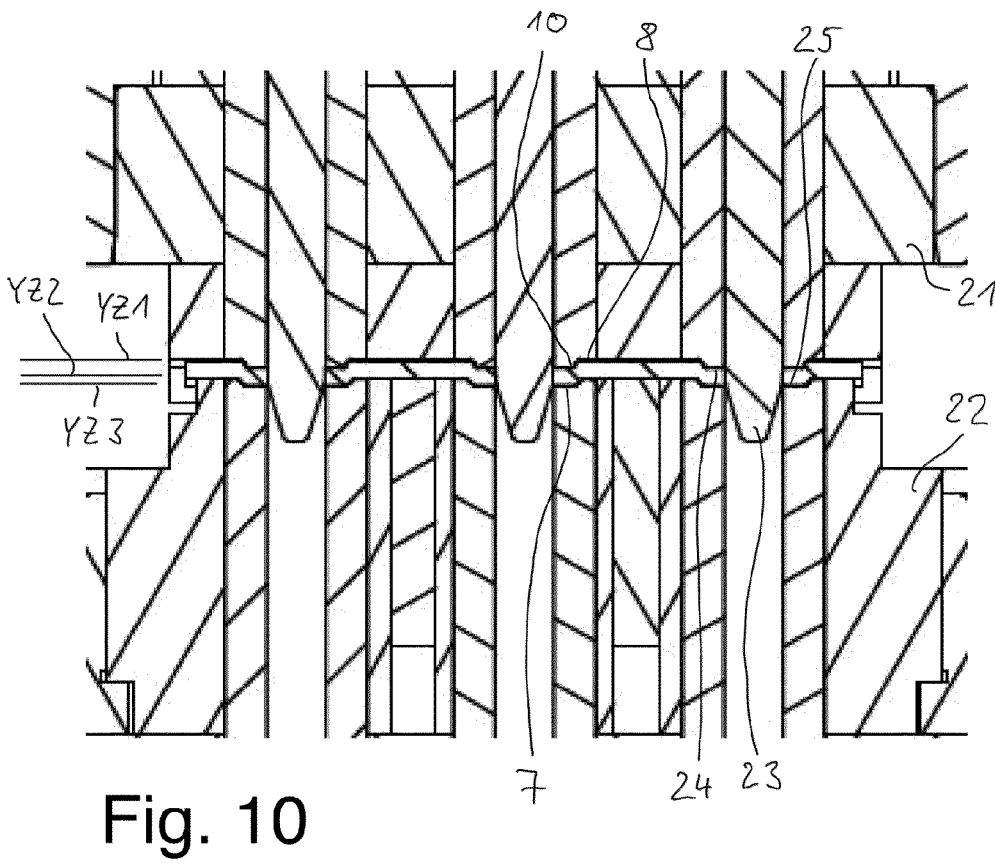
Figure 11A:
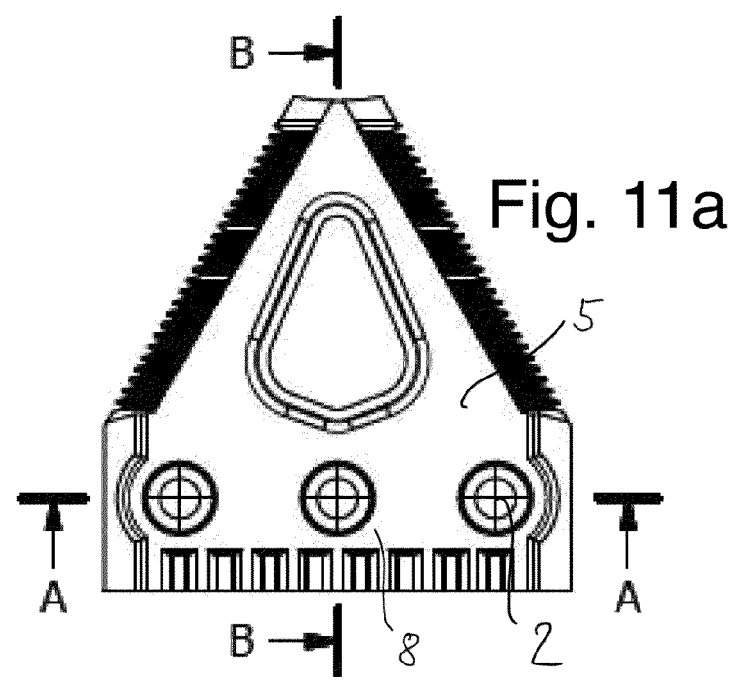

FIGS. 8*a*, 8*b* and 8*c* show a knife blade produced according to the exemplary embodiment of the method according to FIG. 7 in various views;

FIGS. 9*a* and 9*b* show the knife blade according to FIG. 8*a* in sectional views;

FIG. 10 shows a schematic sectional view of the blade blank according to FIG. 1*a* during the reshaping step according to a variant of the method in a die;

FIGS. 11*a*, 11*b* and 11*c* show a knife blade produced according to the exemplary embodiment of the method according to FIG. 10 in various views;

FIGS. 12*a* and 12*b* show the knife blade according to FIG. 11*a* in sectional views.

FIGS. 1*a* to 3*c* illustrate in a first exemplary embodiment a possible sequence of the method for manufacturing a knife blade for a cutter knife of an agricultural harvesting machine in several processing steps. A substantially disk-shaped blade blank 1 is provided in a providing step, wherein the blade blank has a bottom side 5 extending in a first plane YZ1 and a top side 6 extending in a second plane YZ2. The illustrations of the blade blank 1 are partially schematic. For example, cutting edges are missing from the representation, which can be introduced at a later time, but can also already be present in the blade blank 1 provided.

Figures 2A, 2B, 2C:
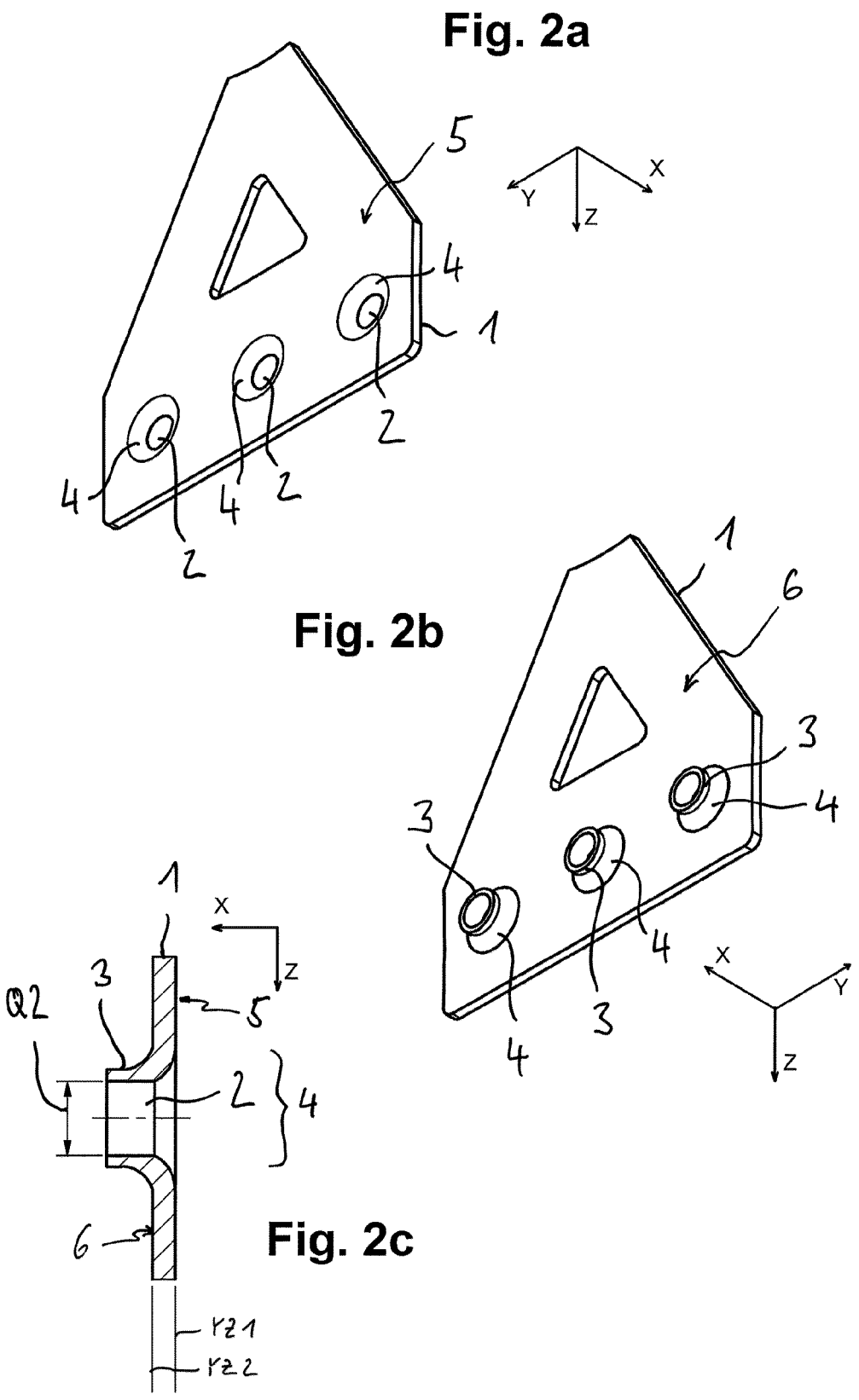
FIGS. 2a, 2b and 2c show the blade blank according to FIG. 1a after a first reshaping of the reshaping step according to the first exemplary embodiment of the method in different views.
Figures 3A, 3B, 3C:
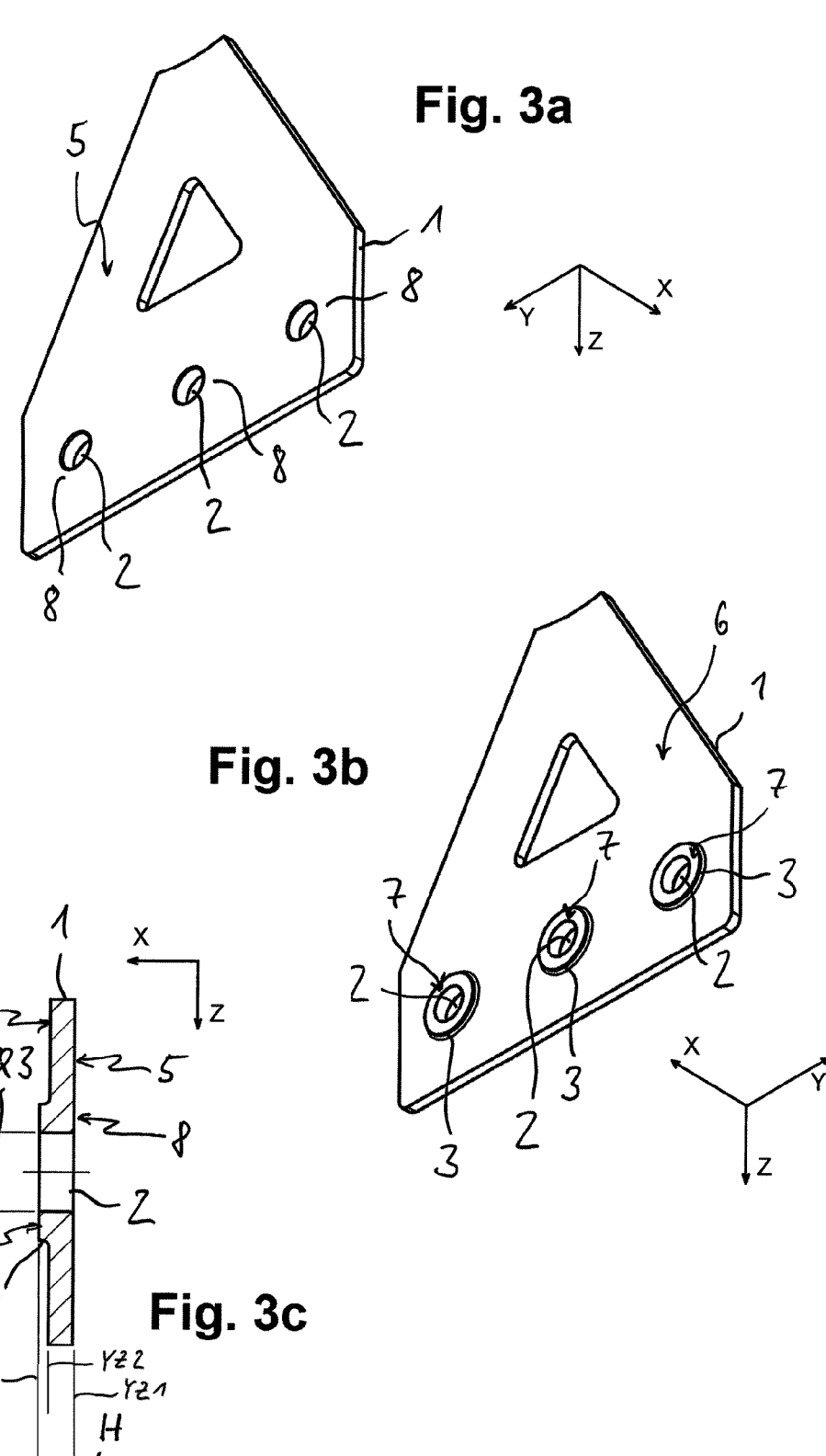
FIGS. 3a, 3b and 3c show the blade blank according to FIG. 1a after a second reshaping of the reshaping step according to the first exemplary embodiment of the method in different views.

The illustrations of FIGS. 1*a*, 2*a* and 3*a* each show the blade blank 1 in perspective with a view of the bottom side 5 of the blade blank 1. A Cartesian coordinate system with spatial directions X, Y and Z defines the three spatial directions. In all Figures described below, the definition of the Cartesian coordinate system is identical and will not be explained again. This applies regardless of whether a coordinate cross is drawn in the following Figures or not. In the exemplary embodiment, the planes YZ1 and YZ2 are spanned in the spatial directions Y and Z and are thus parallel to each other. In FIGS. 1*b*, 2*b* and 3*b*, the blade blank 1 is also shown in each case in perspective, but looking at the top side 6 of the blade blank 1. FIGS. 1*c*, 2*c* and 3*c* show a sectional view of a part of the blade blank 1. The sectional plane is arranged parallel to the plane spanned by the spatial directions X and Z and passes through a hole 2.

The blade blank 1 provided is described below with reference to FIGS. 1*a*, 1*b* and 1*c*. A comparable blade blank 1 may be used in any of the described embodiments of the method. The hole 2 is made in the blade blank 1 in the spatial direction X, for example. In the exemplary embodiment, three holes 2 are made in the region near a rear edge 9 of the blade blank 1, which, for example, later serve to fasten the completed knife blade. The holes 2 have a dimension Q1, from which a cross-sectional area of each hole 2 is obtained before reshaping. In the exemplary embodiment, the holes 2 are cylindrical holes in the direction X connecting the top side 6 and the opposite bottom side 5 of the blade blank 1. In FIG. 1*c*, a section through one of the holes 2 is shown, revealing the dimension Q1 as the diameter Q1 of the hole 2. The cross-sectional area of the hole 2 before reshaping is calculated as the product of the mathematical constant Pi with the square of half the diameter.

A reshaping step is described with reference to FIGS. 2*a* to 3*c*. In the reshaping step, an area 4 of the blade blank 1 surrounding the hole 2 is deformed such that a top contact surface 7 surrounding the hole 2 is formed in a third plane YZ3, wherein the third plane is more distant from the first plane YZ1 in the normal direction X perpendicular to the first plane YZ1. In the exemplary embodiment, the reshaping step comprises two reshaping operations, namely a first reshaping and a second reshaping.

The processed blade blank 1 is shown in FIGS. 2*a*, 2*b* and 2*c* after the first reshaping. In the first reshaping, the area 4 of the blade blank 1 surrounding the hole 2 is deformed into a stub 3 extending in the normal direction X perpendicular to the first plane YZ1 from the blade blank 1. The area 4 surrounding the hole 2 may be deformed to the stub 3 by a tension forming process, such as collar drawing, wherein the hole 2 is expanded to an intermediate cross-sectional area during the first reshaping. In FIG. 2*c*, in the section through the hole 2, the dimension Q2 characterizing the intermediate cross-sectional area, here a diameter Q2, is recognizably larger than the original dimension Q1 in FIG. 1*c*. The approximately ring-shaped area 4 is deformed by the first reshaping in such a way that a trough shape is formed on the bottom side 5 around the hole 2.

The processed blade blank 1 is shown in FIGS. 3*a*, 3*b* and 3*c* after the second reshaping. In the second reshaping, which occurs after the first reshaping, the stub 3 is calibrated to a height H of the blade blank 1, wherein the height H of the blade blank 1 corresponds to a distance from the first plane YZ1 to the third plane YZ3 in the normal direction X. The hole 2 surrounded by the stub 3 is brought to a target cross-sectional area during the second reshaping by a pressing operation, wherein the target cross-sectional area is smaller than or equal to the intermediate cross-sectional area. In FIG. 3*c*, in the section through the hole 2, the dimension Q3 characterizing the target cross-sectional area is indicated, which may be smaller than or equal to the previous dimension Q2. Here, the diameter Q3 is approximately the same as the diameter Q2. For example, the blade blank 1 is fixed for calibration during the second reshaping in a calibration die (not shown) via at least one upper forming die (not shown) and at least one lower forming die (not shown) and at least one calibration pin (not shown) engaging in the hole 2, wherein a pressing pressure is applied to the forming dies, thereby deforming the stub 3. A cross-section of the calibrating pin determines the target cross-sectional area of the hole 2. The predetermined length H of the stub 3 in the direction X can advantageously correspond to a height of the final knife blade. The deformation of the stub 3 during the second reshaping forms the top contact surface 7 surrounding the hole 2 in the third plane YZ3. Furthermore, the deformation of the stub 3 during the second reshaping forms the previously trough-shaped area on the bottom side 5 around the hole 2 into a bottom contact surface 8 arranged in the plane YZ1 around the hole 2 on the bottom side 5 of the blade blank 1.

The number of holes 2 to be made or processed as described above can be selected as desired in the method described, since each hole 2 can basically be made, deformed and calibrated in series in the processing steps described above. Likewise, it can be provided to make, deform and/or calibrate several of the holes 2 in parallel in the previously described processing steps.

FIGS. 3*a*, 3*b* and 3*c* also schematically show an embodiment of the blade for a cutter knife of an agricultural harvester, manufactured according to the method described. After the reshaping step, the blade blank 1 exhibits the features of the knife blade. In particular, the knife blade is characterized by a top contact surface 7 arranged in the plane YZ3, which is formed on the stub 3. In the plane YZ1, on the bottom side 5 opposite the stub 3, the bottom contact surface 8 is formed around the hole 2. The top contact surface 7 and the bottom contact surface 8 can advantageously each be used to bring the knife blade into contact with another planar component, such as a knife rail (not shown), to which a plurality of knife blades are attached. With the top contact surface 7 and the bottom contact surface 8, the knife blade advantageously has a contact surface on each side, so that the knife blade can be fastened alternately with the top side 6 or with the bottom side 5 towards the knife rail.

A further exemplary embodiment of the method is described with reference to FIG. 4, which shows a schematic sectional view of the blade blank 1 according to FIG. 1*a* during the reshaping step in a tool. The tool consists of an upper forming die 21 and a lower forming die 22. The originally disk-shaped blade blank 1 is inserted between the upper forming die 21 and the lower forming die 22. The bottom side 5 extending in the first plane YZ1 faces the lower forming die 22, and the top side 6 extending in the second plane YZ2 faces the upper forming die 21. In the exemplary embodiment, the lower forming die 22 has three calibrating pins 23 which engage in the three holes 2 in the blade blank 1.

Figure 4:
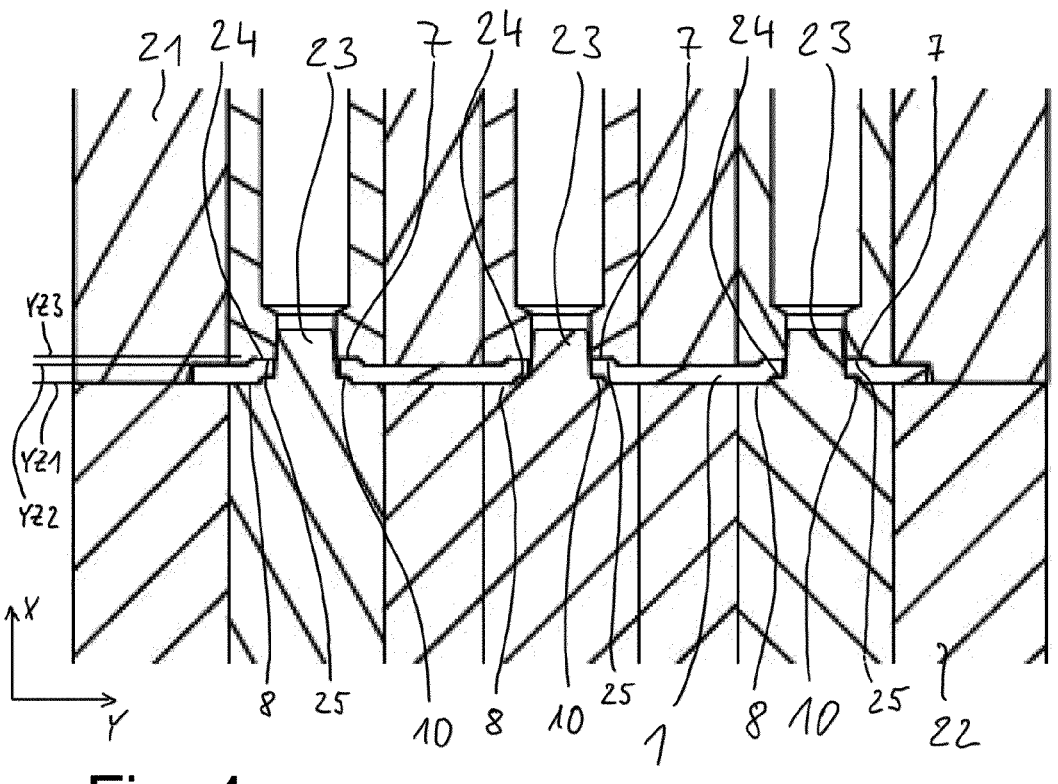
FIG. 4 shows the blade blank according to FIG. 1a during the reshaping step according to a further exemplary embodiment of the method in a tool in a schematic sectional view.

In contrast to the method described initially with reference to FIGS. 1*a* to 3*c*, in the tool according to FIG. 4 the entire reshaping step is carried out in one operation, i.e. without two successive reshaping operations. The area 4 of the blade blank 1 surrounding the hole 2 is deformed to the top contact surface 7 surrounding the hole 2 in the third plane YZ3. In the process, the hole 2 acquires its target cross-sectional area, which is larger than a cross-sectional area of the hole 2 prior to the reshaping step. The peripheral rim 10 around the hole 2 on the bottom side 5 of the blade blank 1 is arranged in the normal direction X between the first plane YZ1 and the second plane YZ2, while the bottom contact surface 8 is formed around the hole 2 on the bottom side 5 of the blade blank 1. The bottom contact surface 8 is arranged in the first plane YZ1 around the peripheral rim 10. For this purpose, the lower forming die 22 has a shoulder 24 surrounding the calibration pin 23, which cooperates with an annular recess 25 on the upper forming die 21 to deform the area 4 around the hole 2 of the blade blank 1 in a pressing operation. In the reshaping step, the blade blank 1 is shaped in such a way that the material thickness of the blade is, at least in certain sections, less than the height H of the blade, which corresponds to the distance from the first plane YZ1 to the third plane YZ3 in the normal direction X. In principle, further reshaping steps can be provided after the reshaping step to produce the final shape of the knife blade. However, these do not relate to the production of the top contact surface 7 in the third plane YZ3 and the bottom contact surface 8 is in the first plane YZ1.

Figure 5A:
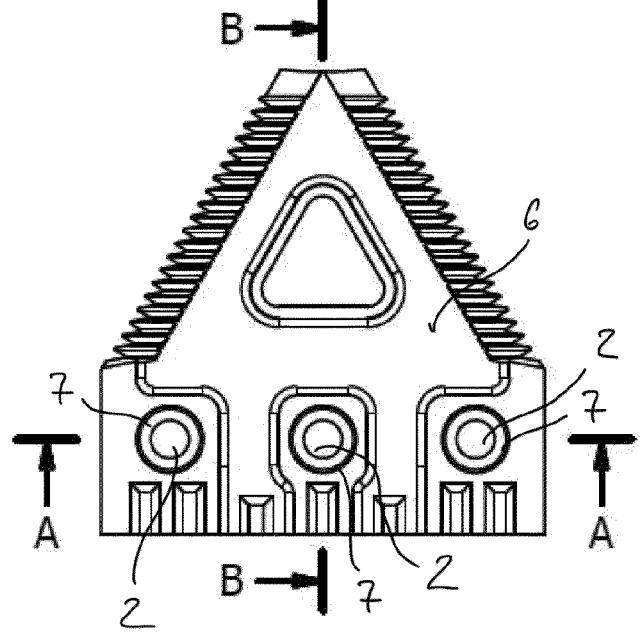
Figures 5B, 5C, 6B:
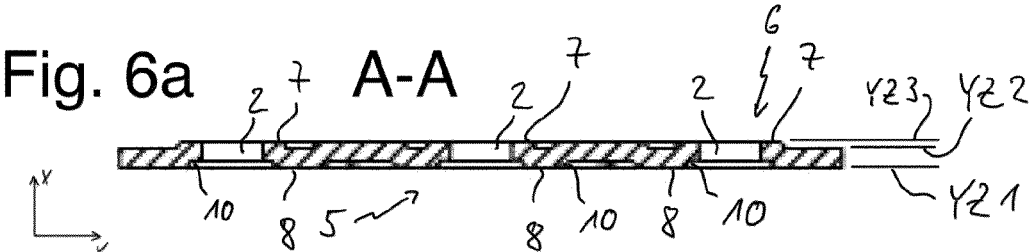

The knife blade, manufactured according to the exemplary embodiment of the method according to FIG. 4 is shown in FIGS. 5*a*, 5*b* and 5*c* in different views. FIG. 5*a* shows a top view looking at the top side 6, while FIGS. 5*b* and 5*c* each show perspective views, firstly looking at the bottom side 5 with the bottom contact surface 8 and secondly looking at the top side 6 with the top contact surface 7. FIG. 6*a* shows a section of the knife blade through the holes 2 along the line A-A in FIG. 5*a*. FIG. 6*b* shows a longitudinal section of the knife blade along line B-B in FIG. 5*a*. In the sectional views, it can be seen that the bottom contact surface 8 extends in the first plane YZ1 and that the top contact surface 7 extends in the third plane YZ3. The third plane YZ3 and the first plane YZ1 are aligned parallel to each other.

A further exemplary embodiment of the method is described with reference to FIG. 7, which shows a schematic sectional view of the blade blank 1 according to FIG. 1*a* during the reshaping step in an alternative tool. The method differs from the exemplary embodiment described with reference to FIG. 4 by the use of a modified tool which likewise consists of the upper forming die 21 and the lower forming die 22. The area 4 of the blade blank 1 surrounding the hole 2 is deformed to the top contact surface 7 surrounding the hole 2 in the third plane YZ3. In the process, the hole 2 acquires its target cross-sectional area, which is larger than a cross-sectional area of the hole 2 prior to the reshaping step. The peripheral rim 10 around the hole 2 on the bottom side 5 of the blade blank 1 is arranged in the normal direction X between the first plane YZ1 and the second plane YZ2, while the bottom contact surface 8 is formed around the hole 2 on the bottom side 5 of the blade blank 1. The bottom contact surface 8 is arranged in the first plane YZ1 around the peripheral rim 10. For this purpose, the lower forming die 22 has a shoulder 24 surrounding the calibration pin 23, which is surrounded by an annular groove 26. The annular groove 26 cooperates with a raised ring 27 on the upper forming die 21. The area 4 around the hole 2 of the blade blank 1 is deformed in the pressing operation between the shoulder 24, the calibration pin 23 and the area inside the raised ring 27 to form the top contact surface 7, while the bottom contact surface 8 is formed in the annular groove 26 by pressing the material of the blade blank 1 through the raised ring 27 into the annular groove 26.

The knife blade manufactured according to the exemplary embodiment of the method according to FIG. 7 is shown in various views in FIGS. 8*a*, 8*b* and 8*c*. FIG. 8*a* shows a top view, while FIGS. 8*b* and 8*c* each show perspective views, firstly looking at the bottom side 5 with the bottom contact surface 8 and secondly looking at the top side 6 with the top contact surface 7. FIG. 9*a* shows a section of the knife blade through the holes 2 along line A-A in FIG. 8*a*. FIG. 9*b* shows a longitudinal section of the knife blade along line B-B in FIG. 8*a*. In the sectional views, it can be seen that the bottom contact surface 8 extends in the first plane YZ1 and that the top contact surface 7 extends in the third plane YZ3. The third plane YZ3 and the first plane YZ1 are aligned parallel to each other.

A variant of the method described with reference to FIG. 4 is now explained with reference to FIG. 10, which shows the blade blank 1 according to FIG. 1*a* during the reshaping step in a tool in a schematic sectional view. The tool consists of the upper forming die 21 and the lower forming die 22. The originally disk-shaped blade blank 1 is inserted between the upper forming die 21 and the lower forming die 22. Unlike in the variant according to FIG. 4, here the bottom side 5 extending in the first plane YZ1 faces the upper forming die 21 and the top side 6 extending in the second plane YZ2 faces the lower forming die 22. In the exemplary embodiment, the upper forming die 21 has three calibration pins 23 which engage in the three holes 2 in the blade blank 1.

The area 4 of the blade blank 1 surrounding the hole 2 is deformed to the top contact surface 7 surrounding the hole 2 in the third plane YZ3. In the process, the hole 2 acquires its target cross-sectional area, which is larger than a cross-sectional area of the hole 2 prior to the reshaping step. The peripheral rim 10 around the hole 2 on the bottom side 5 of the blade blank 1 is arranged in the normal direction X between the first plane YZ1 and the second plane YZ2, while the bottom contact surface 8 is formed around the hole 2 on the bottom side 5 of the blade blank 1. The bottom contact surface 8 is arranged in the first plane YZ1 around the peripheral rim 10. For this purpose, the upper forming die 21 has a shoulder 24 surrounding the calibration pin 23, which cooperates with an annular recess 25 on the lower forming die 22 to deform the area 4 around the hole 2 of the blade blank 1 in a pressing operation. In the reshaping step, the blade blank 1 is shaped in such a way that the material thickness of the blade is, at least in some areas, less than the height H of the blade, which corresponds to the distance from the first plane YZ1 to the third plane YZ3 in the normal direction X. In principle, further reshaping steps can be provided after the reshaping step to produce the final shape of the knife blade. However, these do not relate to the production of the top contact surface 7 in the third plane YZ3 and the bottom contact surface 8 is in the first plane YZ1.

The knife blade manufactured according to the exemplary embodiment of the method according to FIG. 10 is shown in various views in FIGS. 11a, 11b and 11c. FIG. 11a shows a top view looking at the bottom side 5, while FIGS. 11b and 11c each show perspective views. FIG. 11b shows the knife blade looking at the bottom side 5 with the bottom contact surface 8, while FIG. 11c shows the knife blade looking at the top side 6 with the top contact surface 7. The designations top side and bottom side are not to be understood restrictively with respect to the orientation of the knife blade in the installed state. The knife blade according to FIGS. 11a, 11b and 11c represents a laterally reversed variant of the knife blade according to FIGS. 5a, 5b and 5c with respect to the design of the top contact surface 7 and the bottom contact surface 8, wherein the definition of top side 6 and bottom side 5 depends only on the position of the planes YZ1, YZ2 and YZ3. FIG. 12a shows a section of the knife blade through the holes 2 along line A-A in FIG. 11a. FIG. 12b shows a longitudinal section of the knife blade along line B-B in FIG. 11a. In the sectional views, it can be seen that the bottom contact surface 8 extends in the first plane YZ1 and that the top contact surface 8 extends in the third plane YZ3. The third plane YZ3 and the first plane YZ1 are aligned parallel to each other.

REFERENCE SIGNS

1 Blade blank
2 Hole
3 Stub
4 Area
5 Bottom side
6 Top side
7 Top contact surface
8 Bottom contact surface
9 Rear edge
10 Peripheral rim
21 Upper forming die
22 Lower forming die
23 Calibration pin
24 Step
25 Annular recess
26 Annular groove
27 Raised ring
H Length
Q1 Characterizing dimension of the cross-sectional area of the hole
Q2 Characterizing dimension of intermediate cross-sectional area
Q3 Characterizing dimension of the target cross-sectional area X, Y, Z Spatial directions
YZ1 First plane
YZ2 Second plane
YZ3 Third plane

The invention claimed is:

1. A method of manufacturing a knife blade for a cutter knife of an agricultural harvesting machine, the method comprising:

providing a blade blank, the blade blank having a polygonal shape forming a rectangular mounting portion and a tapered blade portion, wherein the blade blank has a bottom side extending in a first plane and a top side extending in a second plane, wherein a hole connecting the first plane with the second plane is made in the blade blank, reshaping an area surrounding the hole of the blade blank by deforming in such a way that a top contact surface surrounding the hole is formed in a third plane, wherein the third plane is more distant from the first plane than the second plane in a normal direction perpendicular to the first plane, the top contact surface being adapted to be mounted to a knife rail, wherein in the reshaping step a peripheral rim is formed concentrically around the hole on the bottom side of the blade blank so that the peripheral rim is arranged in the normal direction between the first plane and the second plane, and wherein in the reshaping step a bottom contact surface is maintained around the hole on the bottom side of the blade blank so that the bottom contact surface is arranged in the first plane, the bottom contact surface being adapted to be mounted to the knife rail, wherein the blade blank is adapted to be fastened alternately with the top side or with the bottom side towards the knife rail.

2. The method for manufacturing a knife blade according to claim 1, wherein the reshaping step deforms the blade blank with an upper forming die and a lower forming die, wherein one of the forming dies has a calibration pin engaging in the hole, and applying a pressing pressure to the forming dies so that the top contact surface is thereby formed.

3. The method for producing a knife blade according to claim 1, wherein in the reshaping step the blade blank is shaped in such a way that a material thickness of the knife blade is at least in sections smaller than a height (H) of the knife blade, wherein the height of the knife blade corresponds to a distance of the first plane to the third plane in the normal direction.

4. The method of manufacturing a knife blade according to claim 1, wherein the reshaping step deforms the area surrounding the hole to the top contact surface by generating both tensile stresses and compression stresses so that the hole is brought to a target cross-sectional area.

5. The method of manufacturing a knife blade according to claim 4, wherein the target cross-sectional area is larger than a cross-sectional area of the hole before the reshaping.

* * * * *